(12) United States Patent
Hunt

(10) Patent No.: US 8,949,276 B1
(45) Date of Patent: Feb. 3, 2015

(54) METHODS AND SYSTEMS FOR CONTROLLING STORAGE AND TRANSMISSION OF DATA

(71) Applicant: The Boeing Company, Seal Beach, CA (US)

(72) Inventor: Jeffrey H. Hunt, Thousand Oaks, CA (US)

(73) Assignee: The Boeing company, Chicago, IL (US)

( * ) Notice: Subject to any disclaimer, the term of this patent is extended or adjusted under 35 U.S.C. 154(b) by 51 days.

(21) Appl. No.: 13/732,772

(22) Filed: Jan. 2, 2013

Related U.S. Application Data

(62) Division of application No. 12/899,922, filed on Oct. 7, 2010, now Pat. No. 8,370,392.

(51) Int. Cl.
*G06F 17/30* (2006.01)
*H04L 29/08* (2006.01)

(52) U.S. Cl.
CPC ............... *H04L 67/06* (2013.01); *G06F 17/30* (2013.01)
USPC ........... 707/791; 707/713; 707/722; 707/736; 707/758; 707/781; 707/802; 707/822; 707/828

(58) Field of Classification Search
CPC ...................................... G06F 17/30
USPC .................................. 707/600–899
See application file for complete search history.

(56) References Cited

U.S. PATENT DOCUMENTS

| | | |
|---|---|---|
| 2007/0033446 A1* | 2/2007 | Tinkler et al. .................. 714/47 |
| 2008/0040718 A1 | 2/2008 | Cloonan et al. |
| 2010/0080566 A1 | 4/2010 | Hunt |
| 2010/0127852 A1 | 5/2010 | Hunt |
| 2010/0148033 A1 | 6/2010 | Hunt |

* cited by examiner

*Primary Examiner* — Isaac M Woo
(74) *Attorney, Agent, or Firm* — Armstrong Teasdale LLP

(57) ABSTRACT

A mobile platform includes a sensor configured to collect raw data, a memory device, and a first processing device coupled to the sensor and to the memory device. The first processing device is configured to receive raw data from the sensor and determine, based on a significance of the raw data, whether to store the raw data in the memory device or to transmit the raw data.

15 Claims, 4 Drawing Sheets

METHODS AND SYSTEMS FOR CONTROLLING STORAGE AND TRANSMISSION OF DATA

CROSS REFERENCE TO RELATED APPLICATIONS

This application is a divisional of U.S. patent application Ser. No. 12/899,922, filed Oct. 7, 2010, which is incorporated herein by reference in its entirety.

BACKGROUND

The field of the disclosure relates generally to a geographically distributed network, and more specifically, to controlling storage and transmission of data within the geographically distributed network.

A geographically distributed network includes a plurality of devices and facilitates communication between those devices. An example of a geographically distributed network is a free-space optical communications network. Light travels in straight lines, requiring point-to-point architectures. For communications systems, straight optical lines, referred to as enabled lines of sight geometries, may be rare. Fiber optics allow light to be transmitted along various geometric paths. Fiber optics also provide a high communications bandwidth.

Fiber optics can not be used in some applications, for example, communication to and from an aircraft. Other types of wireless communications, for example communications in the microwave or RF frequencies, have longer wavelengths that cause the beam to diffract and spread faster as they propagate than optical communications. However, the longer wavelengths have carrier frequencies orders of magnitude lower than optical wavelengths. As a result, they have intrinsically slower data rates.

Sensors may be included within unmanned air vehicles (UAV) and used to collect data while the UAV is airborne. Raw data is considered to be any data output by a sensor before any processing is performed on the data. Typically, the data collected by the sensors is stored in a memory device also included within the UAV. When the UAV lands, the data is removed from the UAV by either coupling a computer to the UAV and removing the data, or by physically removing the memory device from the UAV and accessing the data stored in the memory device using known methods at a separate location. Typically, the data stored in the memory device is not accessible to an end user for, at best, several days after the data was acquired by the sensors. Other known systems transmit all data collected by the sensors to a ground facility. Such systems have limitations on the amount of data the sensors are allowed to collect so as not to exceed the bandwidth of the communication channels between the UAV and the ground facility. The bandwidth required to transmit the large capacity of data that may be generated by the sensors limits wireless transmission of the data to ground devices. This causes a delay between when the data is acquired and when the data can be analyzed or used.

BRIEF DESCRIPTION

In one aspect, a mobile platform is provided for collecting data. The mobile platform includes a sensor configured to collect raw data, a memory device, and a first processing device coupled to the sensor and to the memory device. The first processing device is configured to receive raw data from the sensor and determine, based on a significance of the raw data, whether to store the raw data in the memory device or to transmit the raw data.

In another aspect, a mobile platform is provided for collecting data. The mobile platform includes a sensor configured to collect raw data, a memory device, a first processing device coupled to the sensor and to the memory device, and a second processing device coupled to the first processing device. The first processing device is configured to receive the raw data from the sensor and determine, based on a significance of the raw data, whether to store the raw data in the memory device or to transmit the raw data. The second processing device is configured to convert at least a portion of the raw data into information and transmit the information to an end user.

In yet another aspect, a method is provided for storing and transmitting data within a network. The method includes determining a first priority ranking of raw data. The first priority ranking includes a high priority data or a low priority data. The low priority raw data is stored in a first memory device. A second priority ranking of the high priority raw data is determined. A first portion of the high priority raw data is transmitted to a user based on the second priority ranking. A second portion of the high priority raw data is converted into information.

DETAILED DESCRIPTION

The methods, systems, and computer readable media described herein facilitate storing and transmitting data based on a significance assigned to that type of data. The methods, systems, and computer readable media described herein facilitate determining a priority level of the data, storing low priority data, and transmitting high priority data. Storing low priority data facilitates rapid transmission of high priority data to individuals who can use the data. Furthermore, the methods, systems, and computer readable media described herein facilitate converting the high priority raw data to information and transmitting that information to end users in a time scale that is appropriate for the information to be useful for active engagement instead of passive reaction.

Technical effects of the methods, systems, and computer-readable media described herein include at least one of: (a) receiving raw data at a first processing device; (b) determining a first priority ranking of the raw data, the first priority ranking including one of a high priority and a low priority; (c) storing low priority raw data in a first memory device; and (d) transmitting high priority raw data to a second processing device.

The term "platform" (may also be referred to as "source") as used herein, includes aircrafts, helicopters, satellites, automobiles, and any terrestrial or airborne vehicle.

Figure 1:
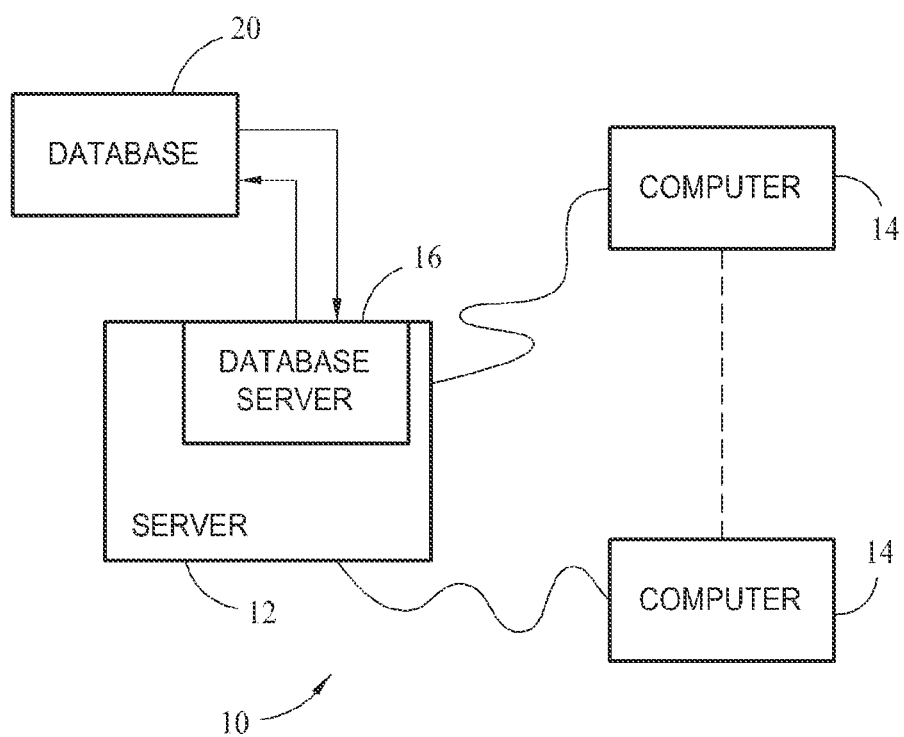
FIG. 1 is a simplified block diagram of an exemplary embodiment of a system architecture.

FIG. 1 is a simplified block diagram of an exemplary system 10, which is one example of a system that could run the above mentioned, and below described algorithms. More specifically, in the example embodiment, system 10 includes a server system 12, and a plurality of client sub-systems, also referred to as client systems 14, connected to server system 12. Although described herein as including server system 12, system 10 may also facilitate communication between client systems 14 without use of server system 12. In one embodiment, client systems 14 are computers that include a receiver and/or a transmitter for receiving and/or transmitting data. Client systems 14 could be any device capable of interconnecting over a geographically distributed network including a web-based phone, personal digital assistant (PDA), or other connectable equipment. A database server 16 is connected to database 20 which may contain, for example, data related to significance levels assigned to various types (e.g., categories) of collected data, as described below in greater detail.

In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

As further explained herein, an operational sequence performed utilizing system 10 includes receiving raw data, determining a first priority of the raw data, the first priority including one of a high priority and a low priority, storing low priority raw data in a first memory device, and transmitting high priority raw data to a second processing device.

Figure 2:
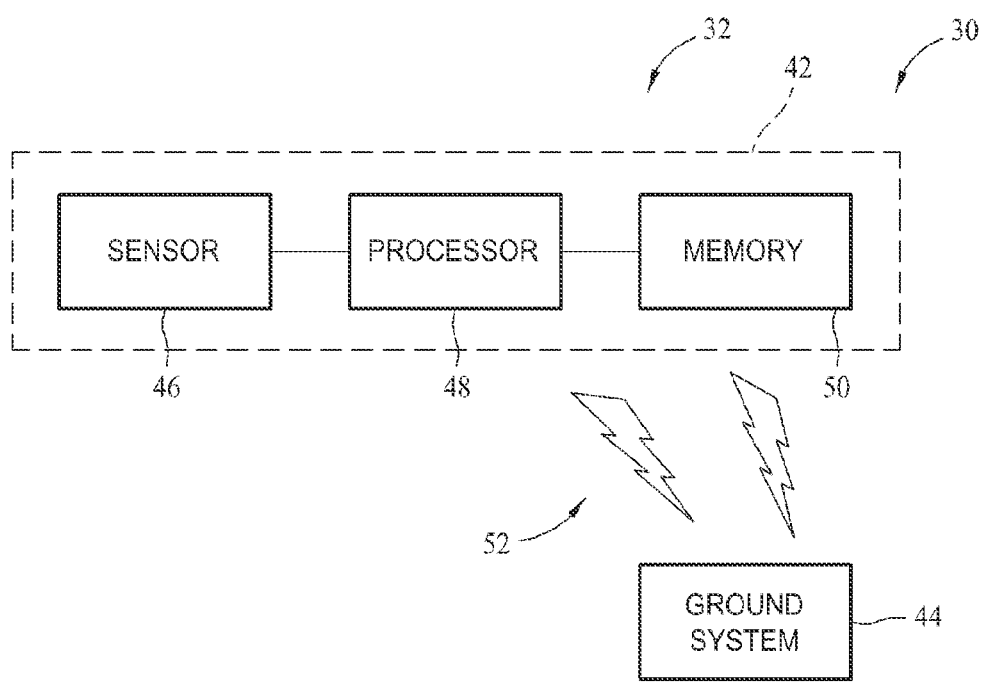
FIG. 2 is a block diagram of an exemplary embodiment of a geographically distributed network that may include an unmanned air vehicle (UAV) used to collect data.

FIG. 2 is a block diagram 30 of a geographically distributed network 32. Geographically distributed network 32 includes a mobile platform, for example, an unmanned air vehicle (UAV) 42 used to collect data and a ground system 44. UAV 42 includes at least one sensor 46, a processor 48, and a memory device 50. Sensor 46 may include, but is not limited to, a spectral sensor, an optical sensor, and/or a temporal sensor. More specifically, sensor 46 may include, but is not limited to, a radio frequency sensor, a camera, lidar and/or radar.

The term processor, as used herein, refers to central processing units, microprocessors, microcontrollers, reduced instruction set circuits (RISC), application specific integrated circuits (ASIC), logic circuits, and any other circuit or processing device capable of executing the functions described herein.

Bandwidth limitations of communication channels 52 between UAV 42 and ground system 44 prevent transmission of all of the data collected by sensor 46.

Figure 3:
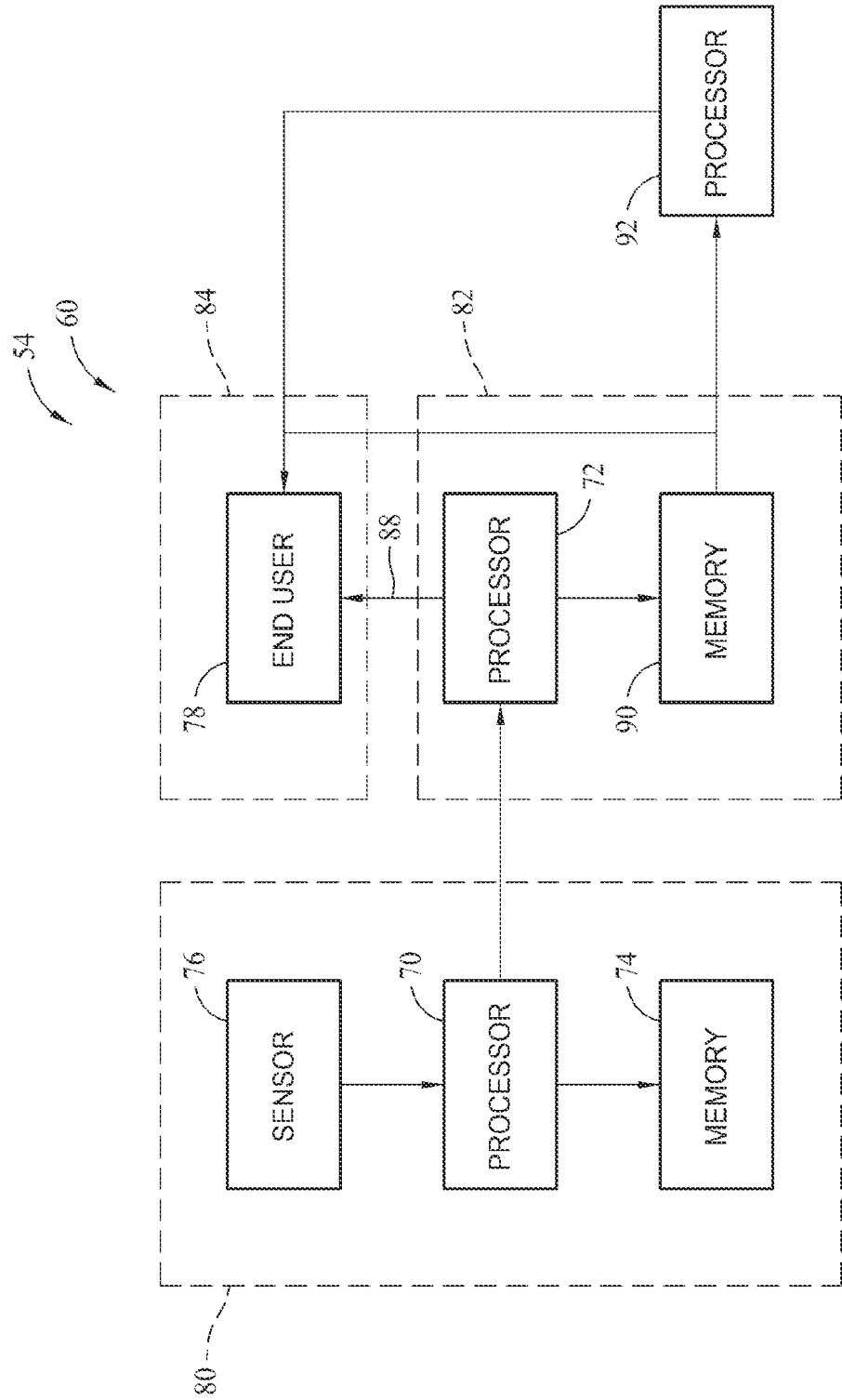
FIG. 3 is a block diagram of an exemplary data storage and handling system.

FIG. 3 is a block diagram 54 of an exemplary embodiment of a data storage and transmission system 60. In the exemplary embodiment, data storage and transmission system 60 includes a first processor 70, a second processor 72, and a first memory device 74. System 60 also includes at least one data collection device, for example, a sensor 76. As described above with respect to sensor 46, sensor 76 may include, but is not limited to, a spectral sensor, an optical sensor, and/or a temporal sensor. More specifically, sensor 76 may include, but is not limited to, a radio frequency sensor, a camera, lidar and/or radar. System 60 collects, stores, and transmits the collected data from sensor 76 to an end user 78. More specifically, system 60 controls storage and transmission of the collected data based at least partially on a predefined priority level the raw data is included within. The predefined priority level is based on a significance assigned to that type of raw data. Therefore, storage and transmission of the collected data is based on the significance of the collected raw data.

Sensor 76, first processor 70, and first memory device 74 are positioned within a first platform 80, for example, a UAV. Second processor 72 and end user 78 are positioned remotely from first platform 80 at a second platform 82 or at the second platform 82 and a third platform 84. Although described as positioned within second platform 82 and third platform 84, second processor 72 may be positioned within a ground system, for example, ground system 44 (shown in FIG. 2), or within any other suitable location that allows system 60 to function as described herein.

In the exemplary embodiment, sensor 76 collects raw data. For example, sensor 76 may collect a first type of raw data, a second type of raw data, and a third type of raw data. Sensor 76 is coupled to first processor 70 and provides the raw data to first processor 70. First processor 70 determines a first priority ranking of the raw data. For example, the first priority ranking may include one of a high priority level and a low priority level. The priority levels are determined based on a predefined significance of the type of data. For example, the first type of raw data may be defined as high priority level raw data based on commander intent. In other words, it is decided in advance that all of the first type of raw data collected by sensor 76 is high priority level raw data. Furthermore, it may be decided in advance that all of the second type of raw data collected by sensor 76 is low priority level raw data.

In the exemplary embodiment, first processor 70 transmits the low priority level raw data to first memory device 74, which is coupled to first processor 70. First memory device 74 stores the low priority level raw data until it is accessed by an end user after first platform 80 completes data collection and returns to a ground system. First processor 70 transmits the high priority level raw data to second processor 72. Second processor 72 determines a second priority ranking of the high priority level raw data. The second priority ranking includes one of a first priority level, a second priority level, and a third priority level. Once again, the types of raw data classified within the first priority level, the second priority level, and the third priority level are predefined based on a predefined significance of the type of raw data.

In the exemplary embodiment, second processing device 72 includes a high bandwidth communications output 88 configured to transmit the first priority level raw data to end user 78. The first priority level raw data is predefined as having the greatest significance, and after this type of raw data is collected by sensor 76, it is transmitted wirelessly from first processor 70 to second processor 72, where it is transmitted via high bandwidth communications to end user 78. First priority level raw data is not stored, rather, it is rapidly transmitted to end user 78.

System 60 may also include a second memory device 90 coupled to second processor 72. Second processor 72 transmits second priority level raw data and third priority level raw data to second memory device 90. Second memory device 90 stores the second priority level raw data and the third priority level raw data. Second priority level raw data is also transmitted to end user 78 via high bandwidth communications, however, second priority level raw data is stored in second memory device 90 to allow first priority level raw data to be transmitted first. For example, second priority level raw data is predefined to be of less significance than first priority level raw data, but of greater significance than third priority level raw data.

System 60 may also include a third processor 92 coupled to second memory device 90. Second processor 72 transmits third priority level raw data from second memory device 90 to third processor 92. Third priority level raw data may be transmitted using any suitable type of electronic communication, including, wired or wireless communication. Since third priority level raw data is defined as having the lowest significance, the transmission speed of data transferred between memory 90 and processor 92 is not a significant factor in selection of the method of data transmission. Third processor 92 receives the third priority level raw data and converts the third priority level raw data to information. As referred to herein, information is processed raw data. Furthermore, third processor 92 transmits the information to the user.

By controlling transmission and storage of raw data, system 60 reserves communications bandwidth by storing lower priority raw data, which facilitates more rapidly providing end user 78 with high priority raw data and/or information extracted from the high priority raw data.

Figure 4:
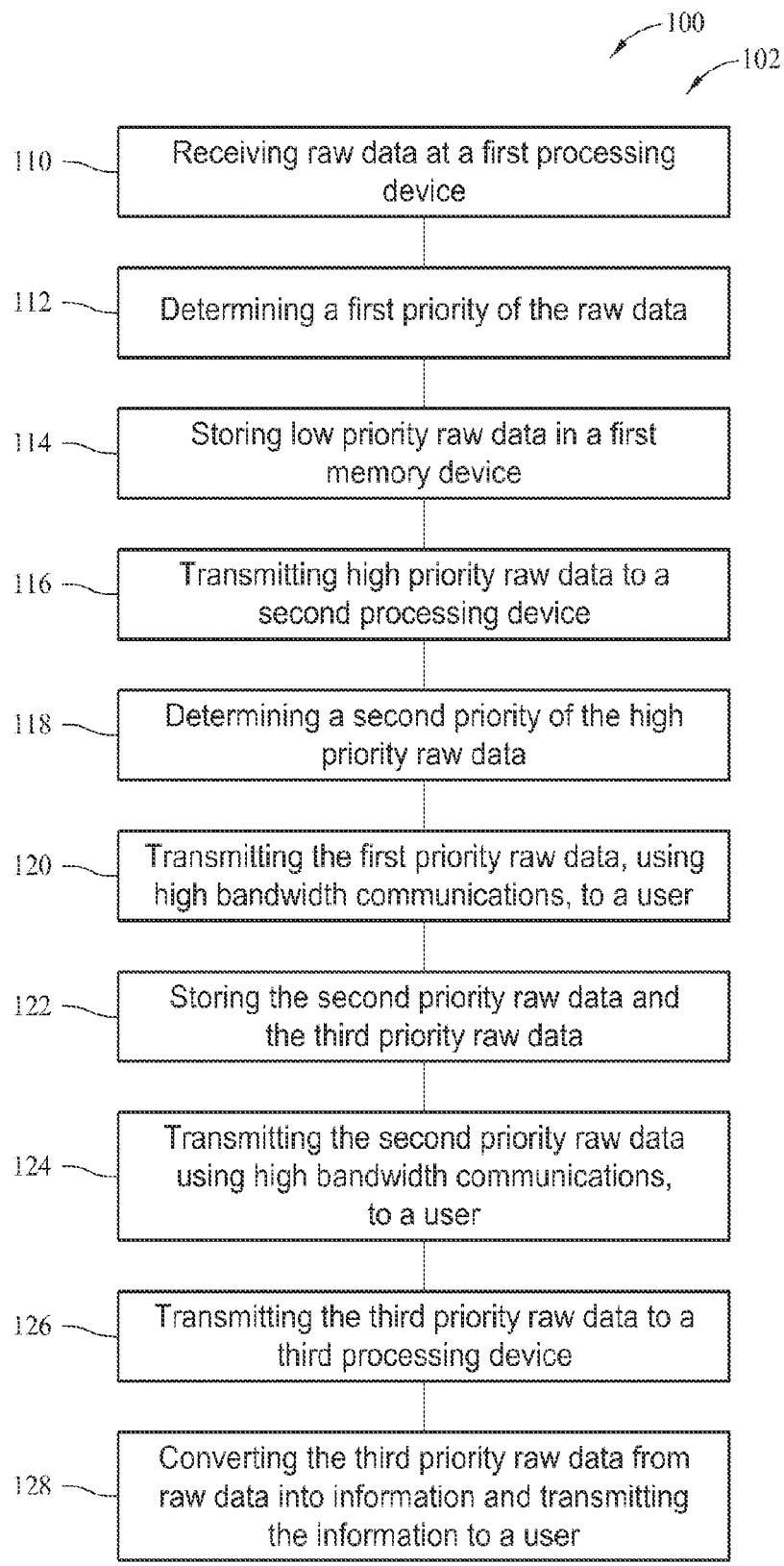
FIG. 4 is a flow chart of an exemplary method for storing and transmitting data within a network.

FIG. 4 is a flow chart 100 of an exemplary method 102 for storing and transmitting data within a geographically distributed network. More specifically, flow chart 100 illustrates an exemplary method 102 for controlling the storage and transmission of data within a geographically distributed network based at least partially on predefined raw data priority levels. In an exemplary embodiment, method 102 is a computer-implemented method, for example, a computer-implemented method executed by server 12 (shown in FIG. 1). In another exemplary embodiment, a computer program embodied on a computer readable medium includes at least one code segment, that when executed by a computer, for example, server 12, performs method 102.

In the exemplary embodiment, method 102 includes receiving 110 raw data at a first processing device, for example, first processor 70 (shown in FIG. 3). As described above, a sensor, for example, sensor 76 (shown in FIG. 3), collects raw data and provides the raw data to first processor 70. Method 102 also includes determining 112 a first priority ranking of the raw data. For example, first processor 70 determines 112 if the collected raw data is high priority level raw data or low priority level raw data. Determination 112 may be based at least partially on a look-up table that includes the types of data collected by sensor 76 and associated priority rankings. Method 102 also includes storing 114 low priority raw data in a first memory device, for example, first memory device 74 (shown in FIG. 3). Method 102 also includes transmitting 116 high priority raw data to a second processing device, for example, second processor 72. For example, first processor 70 transmits 116 high priority raw data to second processor 72.

Method 102 may also include determining 118, for example, using second processor 72, a second priority ranking of the high priority raw data. Second processor 72 determines 118 a priority level to assign to the high priority raw data. The second priority ranking includes one of a first priority, a second priority, and a third priority. Method 102 may also include transmitting 120 the first priority raw data, using high bandwidth communications, to a user. Method 102 may also include storing 122, in a second memory device, the second priority raw data and the third priority raw data. The second priority raw data and the third priority raw data may be stored in a second memory device, for example, second memory device 90 (shown in FIG. 3).

Method 102 may also include transmitting 124 the second priority raw data from second memory device 90, using high bandwidth communications, to a user. Storing 122 the second priority raw data in second memory device 90 facilitates transmitting 120 the first priority raw data to the user before second priority raw data is transmitted 124 to the user.

Method 102 may also include transmitting 126 the third priority raw data from second memory device 90 to a third processing device, for example, third processor 92 (shown in FIG. 3). Method 102 also includes converting 128, using third processor 92, the third priority raw data from raw data into information and transmitting the information to a user. By converting 120 the raw data into information, the end user is provided with actionable battlespace characterization. Less bandwidth is needed to transmit information, compared to raw data, therefore, by transmitting information, pressure on communications is reduced.

Embodiments of the systems and methods described herein may embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Described herein are exemplary methods and systems for controlling storage and transmission of data within a geographically distributed network. More specifically, the methods and systems described herein facilitate determining priority levels of collected data and storing and/or transmitting the collected data based on those priority levels. The methods and systems described herein facilitate efficient and timely transmission of high priority data by assessing the significance of the data. Furthermore, the methods and systems described herein allow actionable information to reach the end users in a time scale that is appropriate for the information to be useful for active engagement instead of passive reaction.

The methods and systems described herein facilitate efficient and economical storage and transmission of data within a geographically distributed network. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

Although the present disclosure has been described with reference to specific embodiments, these embodiments are illustrative only and not limiting. Many other applications and embodiments of the present disclosure will be apparent in light of this disclosure and the following claims.

What is claimed is:

1. A mobile platform for collecting data comprising:
   a sensor configured to collect raw data;
   a memory device; and
   a first processing device coupled to said sensor and to said memory device, said first processing device configured to receive the raw data from said sensor and determine, based on a significance of the raw data, whether to store the raw data in said memory device or to transmit the raw data, wherein the significance of the raw data is based on a priority level assigned to a category of data within which the raw data is assigned, the priority level including one of a high priority level and a low priority level.

2. A mobile platform in accordance with claim 1 wherein said memory device stores the low priority level raw data.

3. A mobile platform in accordance with claim 1 further comprising a communication device, wherein high priority level raw data is transmitted to an end user using the communication device.

4. A mobile platform in accordance with claim 1 wherein said memory device stores predefined relationships between types of raw data collected and the priority level of that type of data.

5. A mobile platform for collecting data comprising:
   a sensor configured to collect raw data;
   a memory device;
   a first processing device coupled to said sensor and to said memory device, said first processing device configured to receive the raw data from said sensor and determine, based on a significance of the raw data, whether to store the raw data in said memory device or to transmit the raw data, wherein the significance of the raw data is based on a priority level assigned to a category of data within which the raw data is assigned, the priority level including one of a high priority level and a low priority level; and
   a second processing device coupled to the first processing device, said second processing device configured to convert at least a portion of the raw data into information and transmit the information to an end user.

6. A mobile platform in accordance with claim 5 wherein said memory device stores the low priority level raw data.

7. A mobile platform in accordance with claim 5 further comprising a communication device, wherein the high priority level raw data is transmitted to the end user using the communication device.

8. A mobile platform in accordance with claim 5 wherein said memory device stores predefined relationships between types of raw data collected and the priority level of that type of data.

9. A method for storing and transmitting data within a network comprising:
   determining a first priority ranking of raw data, the first priority ranking including one of a high priority data and a low priority data;
   storing the low priority raw data in a first memory device;
   determining a second priority ranking of the high priority raw data;
   transmitting a first portion of the high priority raw data to a user based on the second priority ranking; and
   converting a second portion of the high priority raw data into information.

10. A method in accordance with claim 9, wherein the second priority ranking includes one of a first high priority raw data, a second high priority raw data, and a third high priority raw data.

11. A method in accordance with claim 10, wherein transmitting a first portion further comprises transmitting the first portion using high bandwidth communications, the first portion including the first high priority raw data.

12. A method in accordance with claim 10 further comprising storing the second high priority raw data and the third high priority raw data in a second memory device.

13. A method in accordance with claim 12 further comprising transmitting the second high priority raw data to the user from the second memory device using high bandwidth communications, the first portion including the second high priority raw data.

14. A method in accordance with claim 12, wherein the second portion includes the third high priority raw data.

15. A method in accordance with claim 9 further comprising transmitting the information to the user.

* * * * *